(12) United States Patent
Kennedy

(10) Patent No.: US 10,123,619 B2
(45) Date of Patent: Nov. 13, 2018

(54) CANVAS HOLDING ASSEMBLY

(71) Applicant: Thomas Kennedy, Frnaklin, KY (US)

(72) Inventor: Thomas Kennedy, Frnaklin, KY (US)

( * ) Notice: Subject to any disclaimer, the term of this patent is extended or adjusted under 35 U.S.C. 154(b) by 0 days.

(21) Appl. No.: 15/433,393

(22) Filed: Feb. 15, 2017

(65) Prior Publication Data

US 2018/0228289 A1 Aug. 16, 2018

(51) Int. Cl.
| | |
|---|---|
| *F16M 11/04* | (2006.01) |
| *F16M 11/10* | (2006.01) |
| *F16M 11/28* | (2006.01) |
| *A47B 97/04* | (2006.01) |
| *F16B 2/06* | (2006.01) |

(52) U.S. Cl.
CPC .............. *A47B 97/04* (2013.01); *F16B 2/065* (2013.01); *F16M 11/041* (2013.01); *F16M 11/046* (2013.01); *F16M 11/10* (2013.01); *F16M 11/28* (2013.01); *F16M 2200/025* (2013.01)

(58) Field of Classification Search
CPC ...... A47B 97/04; F16M 11/046; F16M 11/10; F16M 11/041; F16M 11/28; F16M 2200/025; F16B 2/065
USPC .......................................... 248/121–156, 449
See application file for complete search history.

(56) References Cited

U.S. PATENT DOCUMENTS

| | | | |
|---|---|---|---|
| 2,912,203 A | 11/1959 | Townsend | |
| 3,095,834 A * | 7/1963 | Killen | A47B 85/06 108/1 |
| 4,165,856 A * | 8/1979 | Wiseheart | A47B 97/04 248/161 |
| 4,703,910 A | 11/1987 | Ross | |
| 5,242,145 A | 9/1993 | Linnell | |
| 5,308,035 A | 5/1994 | Ross | |
| D368,165 S | 3/1996 | Foster | |
| 5,738,316 A * | 4/1998 | Sweere | F16M 11/10 248/123.11 |
| 5,899,429 A | 5/1999 | McCloud | |
| 5,944,896 A * | 8/1999 | Landesman | B05B 13/0285 118/500 |
| 5,979,856 A * | 11/1999 | Hsu | A47B 19/002 248/441.1 |
| 6,076,787 A * | 6/2000 | Troyer | A47B 23/04 248/166 |
| 6,316,706 B1 * | 11/2001 | Sammons | A47B 19/002 84/327 |
| 6,390,433 B1 * | 5/2002 | Kasa-Djukic | A47B 97/04 248/125.1 |
| 6,601,805 B1 * | 8/2003 | Kapp | A47B 97/08 248/171 |

(Continued)

*Primary Examiner* — Muhammad Ijaz

(57) ABSTRACT

A canvas holding assembly for holding large and small canvases includes a base that is tripoidal. A first plate is coupled to and extends from the base. The first plate is substantially parallel to a surface upon which the base is positioned and is configured to position items of a user. A first bar is selectively extendable from a top of the base. A second bar is coupled to and extends from the first bar distal from the base. A first coupler is pivotally coupled to the second bar distal from the first bar. The first coupler is positioned above the first plate. Each of a plurality of holders is configured to couple to a canvas. Each holder comprises a second coupler that is complementary to, and positioned to couple to, the first coupler, such that the holder is configured to couple to the canvas.

14 Claims, 5 Drawing Sheets

(56) References Cited

U.S. PATENT DOCUMENTS

| | | | | |
|---|---|---|---|---|
| 6,604,720 | B1* | 8/2003 | Wilson | A47B 23/04 248/177.1 |
| 2002/0056794 | A1* | 5/2002 | Ibrahim | A47B 19/00 248/177.1 |
| 2002/0066837 | A1* | 6/2002 | Dunbar | A47B 19/002 248/122.1 |
| 2002/0092725 | A1* | 7/2002 | Brown | A47B 3/10 190/11 |
| 2004/0194674 | A1* | 10/2004 | Del Frari | A47B 97/04 108/98 |
| 2006/0231696 | A1* | 10/2006 | Barrios | B25H 1/0014 248/124.1 |
| 2007/0075209 | A1* | 4/2007 | Kapp | A47B 97/04 248/460 |
| 2012/0080580 | A1 | 4/2012 | Densberger | |
| 2015/0374117 | A1* | 12/2015 | Lozano | A47B 19/06 320/107 |
| 2016/0120303 | A1* | 5/2016 | Constantino | F16M 11/42 108/28 |

* cited by examiner

CANVAS HOLDING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to holding assemblies and more particularly pertains to a new holding assembly for holding large and small canvases.

BRIEF SUMMARY OF THE INVENTION

An embodiment of the disclosure meets the needs presented above by generally comprising a base that is tripoidal. A first plate is coupled to and extends from the base. The first plate is substantially parallel to a surface upon which the base is positioned and is configured to position items of a user. A first bar is selectively extendable from a top of the base. A second bar is coupled to and extends from the first bar distal from the base. A first coupler is pivotally coupled to the second bar distal from the first bar. The first coupler is positioned above the first plate. Each of a plurality of holders is configured to couple to a canvas. Each holder comprises a second coupler that is complementary to, and positioned to couple to, the first coupler, such that the holder is configured to couple to the canvas.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
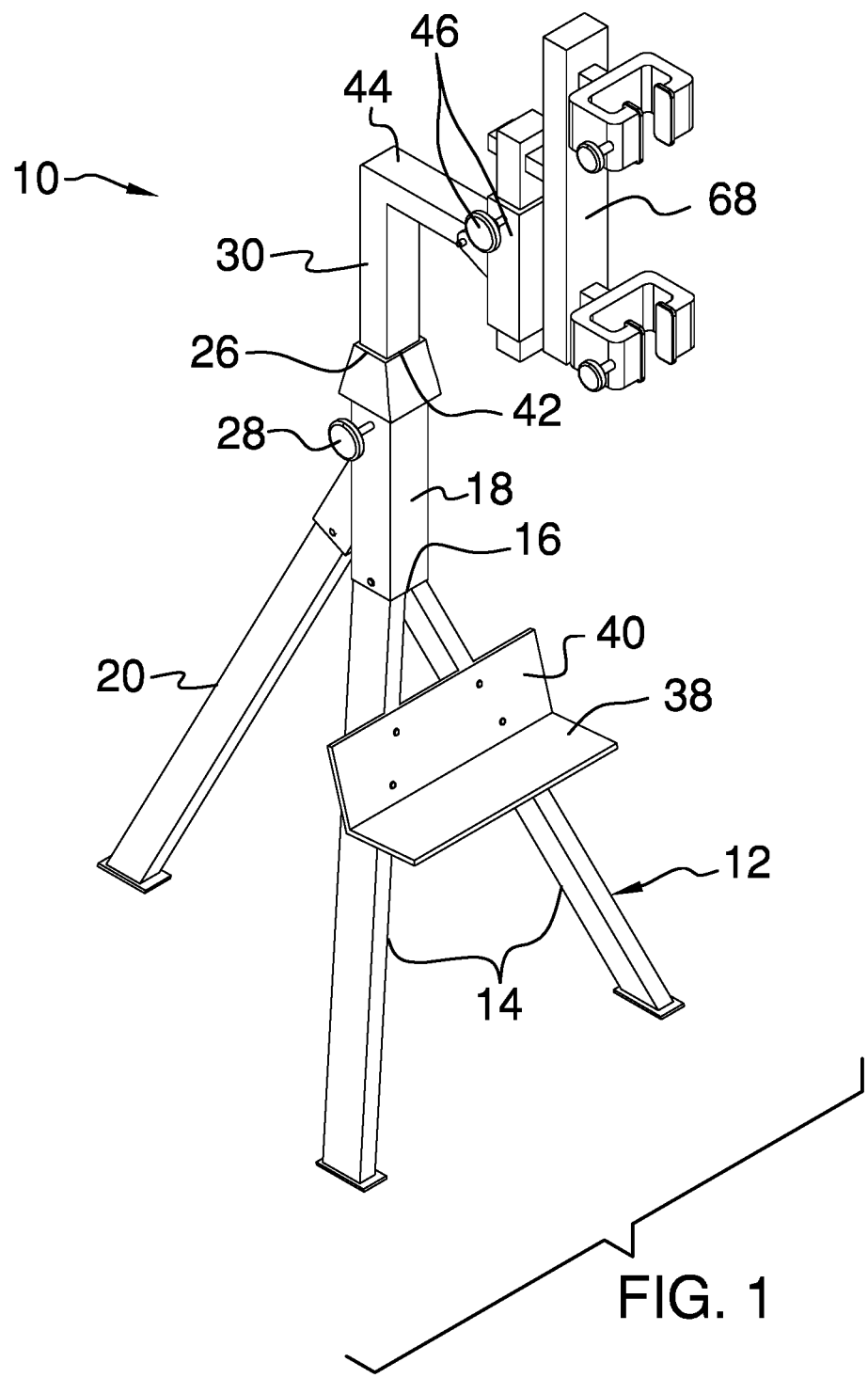
FIG. 1 is an isometric perspective view of a canvas holding assembly according to an embodiment of the disclosure.
Figure 2:
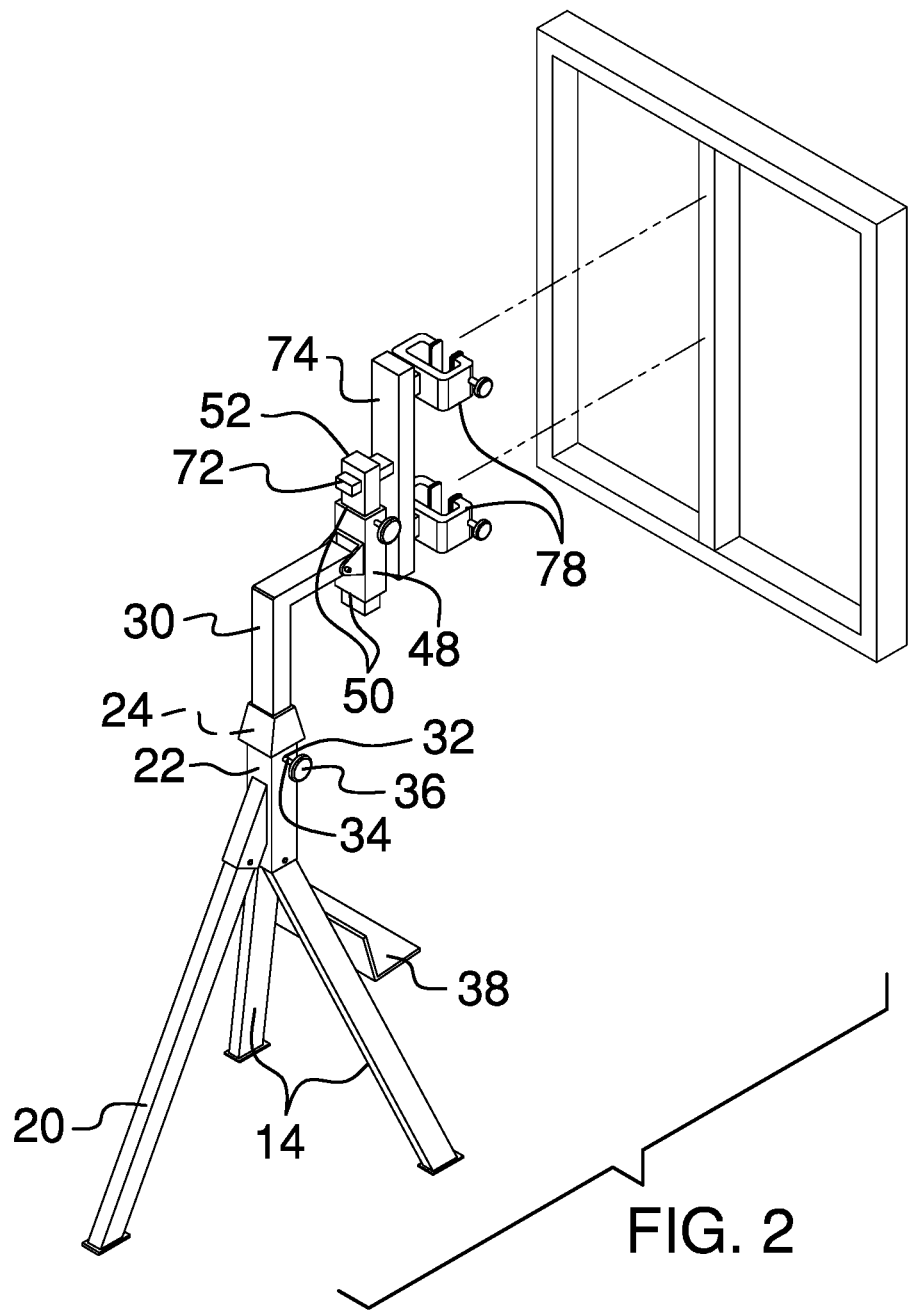
FIG. 2 is an isometric perspective view of an embodiment of the disclosure.
Figure 3:
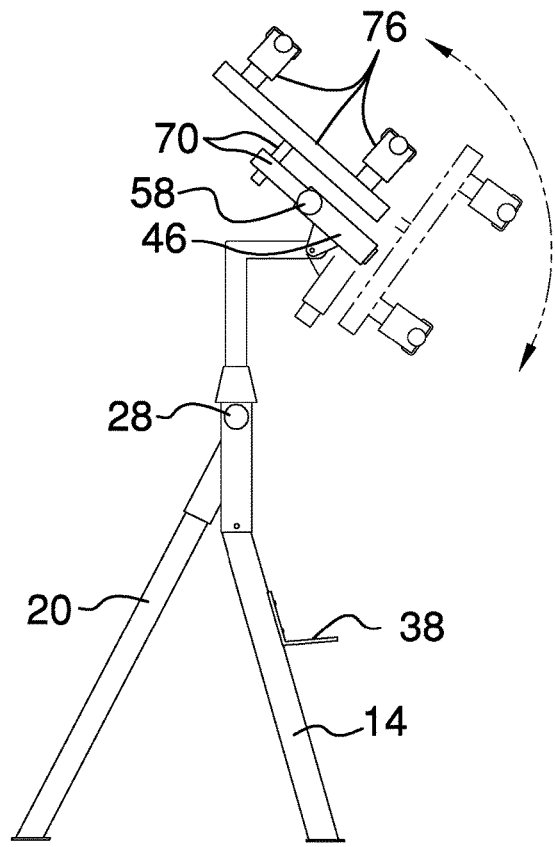
FIG. 3 is a side view of an embodiment of the disclosure.
Figure 4:
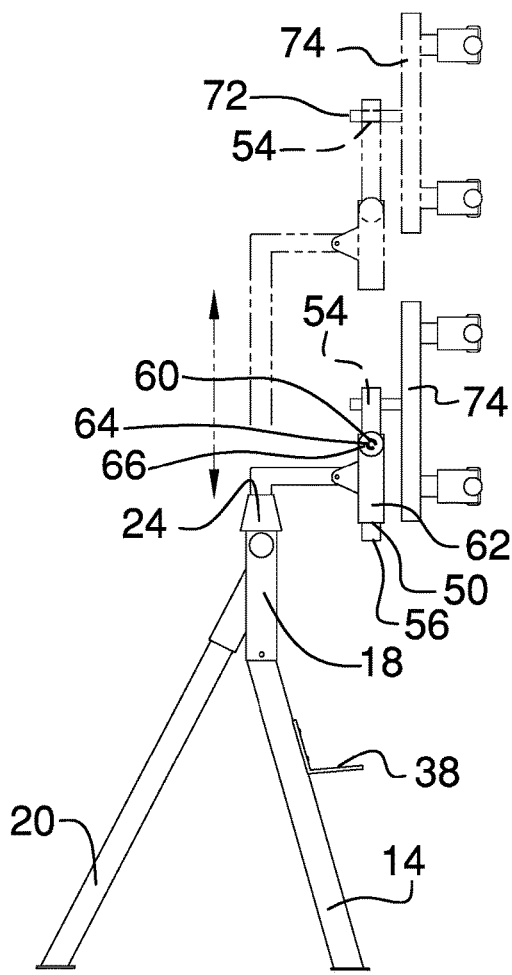
FIG. 4 is a side view of an embodiment of the disclosure.
Figure 5:
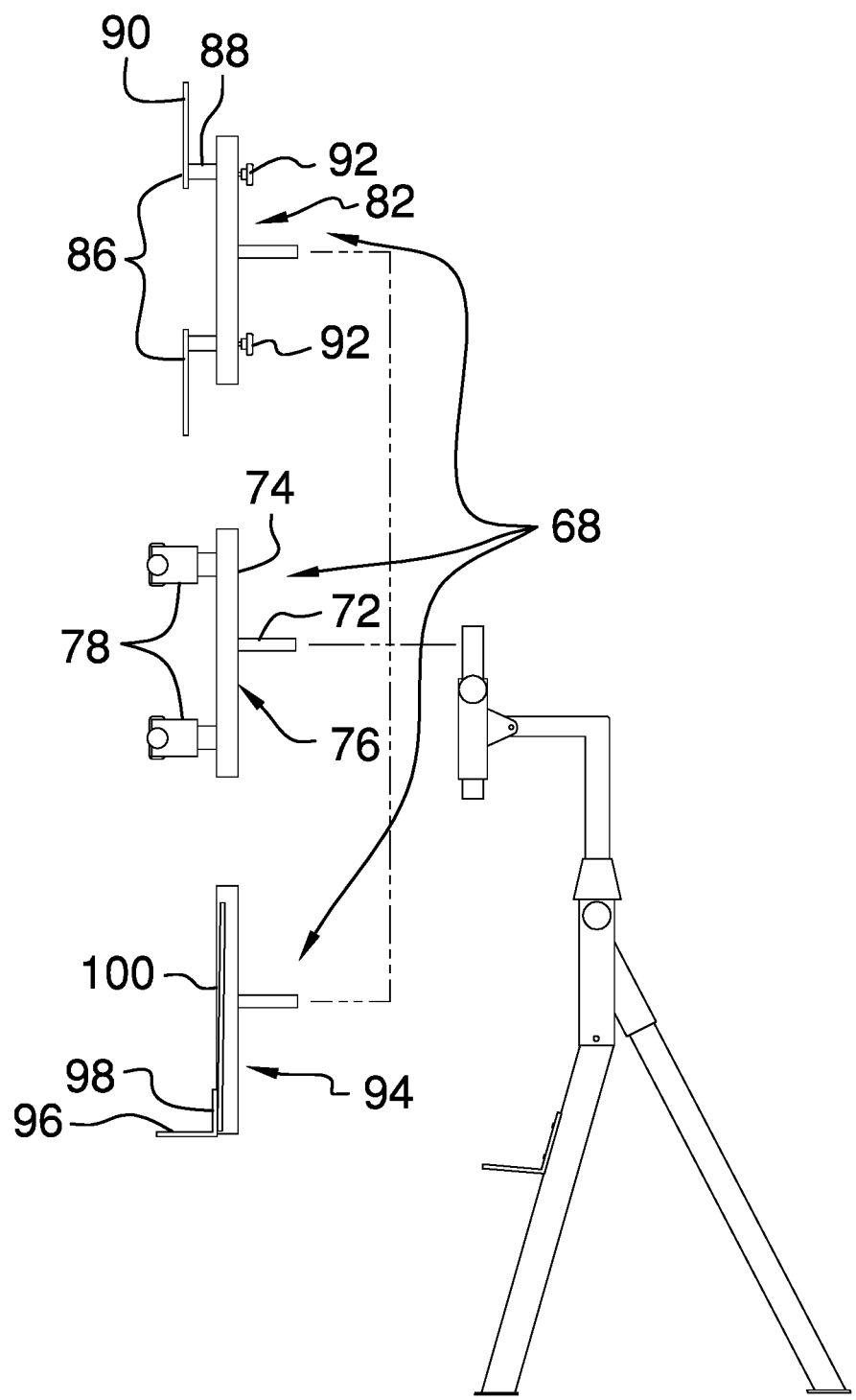
FIG. 5 is a detail view of an embodiment of the disclosure.
Figure 6:
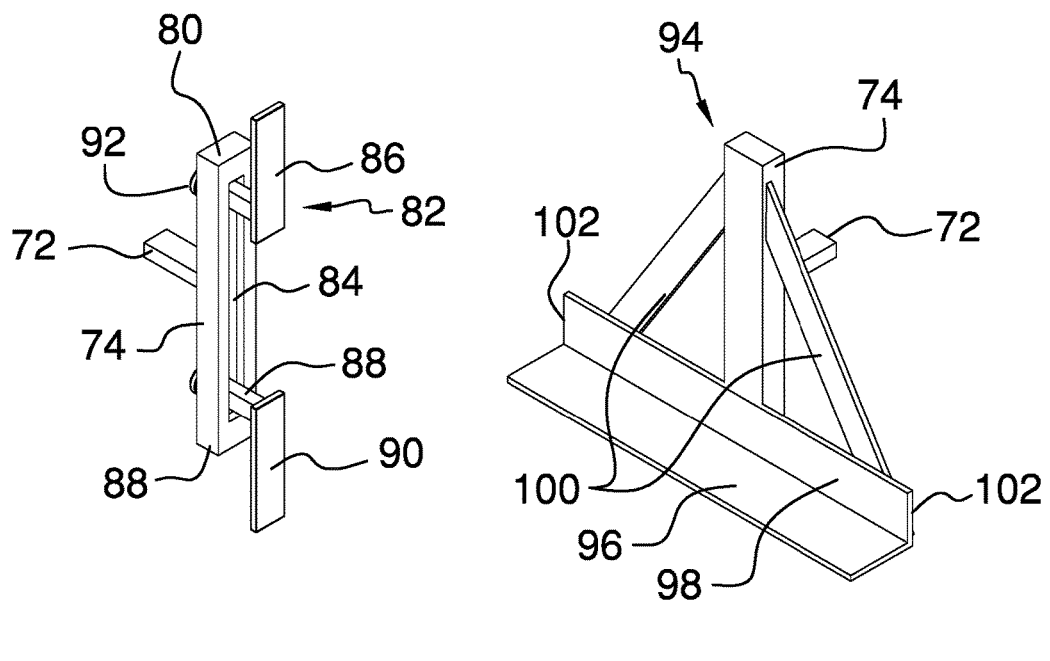
FIG. 6 is a detail view of an embodiment of the disclosure.

With reference now to the drawings, and in particular to FIGS. 1 through 6 thereof, a new holding assembly embodying the principles and concepts of an embodiment of the disclosure and generally designated by the reference numeral 10 will be described.

As best illustrated in FIGS. 1 through 6, the canvas holding assembly 10 generally comprises a base 12 that is tripoidal. In one embodiment, the base 12 comprises a pair of first legs 14 that is coupled to and extends angularly from a lower end 16 of a block 18. A second leg 20 is coupled to and extends angularly from a rear 22 of the block 18. The second leg 20 and the first legs 14 are trigonally positioned.

A channel 24 is positioned in the block 18 and extends from an upper end 26 toward the lower end 16 of the block 18. A first fastener 28 is coupled to the block 18. The first fastener 28 is configured to selectively couple to a first bar 30. The first fastener 28 is positioned to selectively couple to the first bar 30 to selectively fixedly position the first bar 30 relative to the block 18. In one embodiment, the first fastener 28 comprises a first hole 32 that is positioned in the block 18. The first hole 32 extends to the channel 24. The first hole 32 is threaded. A first bolt 34, which is complementary to and positioned in the first hole 32, is threadedly coupled to the block 18. A first knob 36 is coupled the first bolt 34 distal from the block 18. The first knob 36 is configured to be grasped in a hand of a user to turn the first bolt 34 within the first hole 32.

A first plate 38 is coupled to and extends from the base 12. The first plate 38 is substantially parallel to a surface upon which the base 12 is positioned. The first plate 38 is configured to position items of the user. In one embodiment, a second plate 40 is coupled to the first plate 38 and extends toward a top 42 of the base 12. The second plate 40 is configured to retain the items that are positioned on the first plate 38. In another embodiment, the first plate 38 and the second plate 40 are substantially rectangularly shaped.

The first bar 30 is selectively extendable from the top 42 of the base 12. In one embodiment, the first bar 30 is complementary to and slidably positionable in the channel 24. The first bar 30 is selectively extendable from the block 18. The first bolt 34 is selectively rotatable relative to the block 18 to position the first bolt 34 to selectively couple to the first bar 30. The first bar 30 is selectively fixedly positionable relative to the block 18.

A second bar 44 is coupled to and extends from the first bar 30 distal from the base 12. A first coupler 46 is pivotally coupled to the second bar 44 distal from the first bar 30. The first coupler 46 is positioned above the first plate 38. In one embodiment, the first coupler 46 comprises a tube 48 that is pivotally coupled to the second bar 44 distal from the first bar 30. In another embodiment, the second bar 44 is positioned substantially equally distant from opposing ends 50 of the tube 48. The tube 48 is hollow. In yet another embodiment, the tube 48 is substantially rectangularly shaped when viewed longitudinally.

A third bar 52, which is substantially complementary to the tube 48, is slidably positionable within the tube 48. A slot 54 is positioned through the third bar 52 proximate to a respective opposing endpoint 56 of the third bar 52.

A second fastener 58 is coupled to the tube 48. The second fastener 58 is configured to selectively couple to the third bar 52 to selectively fixedly position the third bar 52 relative to the tube 48. In one embodiment, the second fastener 58 comprises a second hole 60 that is positioned through a side 62 of the tube 48. The second hole 60 is threaded. A second bolt 64, which is complementary to and positioned in the second hole 60, is threadedly coupled to the tube 48. The second bolt 64 is selectively rotatable relative to the tube 48 to position the second bolt 64 to selectively couple to the third bar 52. The third bar 52 is selectively fixedly positioned relative to the tube 48. A second knob 66 is coupled the second bolt 64 distal from the tube 48. The second knob 66 is configured to be grasped in the hand of the user to turn the second bolt 64 within the second hole 60.

Each of a plurality of holders 68 is configured to couple to a canvas. Each holder 68 comprises a second coupler 70. The second couplers 70 are complementary to the first coupler 46. Each said second coupler 70 is positioned on a respective holder 68 such that the respective holder 68 is selectively couplable to the second bar 44 and configured to couple to the canvas. In one embodiment, each second coupler 70 comprises a fourth bar 72 and a fifth bar 74. The fourth bar 72 is coupled to and extends perpendicularly from the fifth bar 74. The fourth bar 72 is complementary to the slot 54 that is positioned in the third bar 52. The slot 54 is positioned to insert the fourth bar 72 to couple the holder 68 to the first coupler 46.

The plurality of holders 68 comprises a first grasper 76 that is configured to couple to a central vertical support of a large canvas frame. The first grasper 76 is selectively positionable on the first coupler 46. The first grasper 76 is configured to couple to the central vertical support to position the large canvas frame for manipulation by the user. In one embodiment, the first grasper 76 comprises a pair of C-clamps 78 that is coupled to and extends perpendicularly from the fifth bar 74. Each C-clamp 78 is positioned proximate to a respective opposing terminus 80 of the fifth bar 74. The C-clamps 78 are configured to couple to the central vertical support of the large canvas frame to couple the large canvas frame to the fifth bar 74.

The plurality of holders 68 comprises a second grasper 82 that is configured to couple to an upper support and a lower support of a small canvas frame. The second grasper 82 is selectively positionable on the first coupler 46. The second grasper 82 is configured to couple to the upper support and the lower support to position the small canvas frame for manipulation by the user. In one embodiment, the second grasper 82 comprises a slit 84 that is positioned in the fifth bar 74. The slit 84 extends from proximate to the opposing termini 80 of the fifth bar 74. Each of a pair of L-brackets 86 has a first section 88 that is slidably positioned in the slit 84. The first section 88 extends perpendicularly from the fifth bar 74. Each L-bracket 86 has a second section 90 that is coupled to the first section 88 distal from the fifth bar 74. The second sections 90 are parallel to the fifth bar 74. The second sections 90 are opposingly positioned. The L-brackets 86 are slidably positioned in the slit 84. The L-brackets 86 are configured to position to frictionally couple to the upper support and the lower support of the small canvas frame to couple the small canvas frame to the fifth bar 74. Each of a pair of connectors 92 is coupled to a respective first section 88 distal from an associated second section 90. The connectors 92 are configured to couple to the fifth bar 74. The connectors 92 are positioned to couple to the fifth bar 74 to fixedly position the L-brackets 86 within the slit 84.

The plurality of holders 68 comprises a third grasper 94 that is configured to couple to a bottom support of variously sized canvas frames. The third grasper 94 is selectively positionable on the first coupler 46. The third grasper 94 is configured to couple to the bottom support to position the variously sized canvas frames for manipulation by the user. In one embodiment, the third grasper 94 comprises a third plate 96 that is coupled to and extends perpendicularly from the fifth bar 74 adjacent to a respective opposing terminus 80 of the fifth bar 74. The third plate 96 is configured to couple to the bottom support of a respective variously sized canvas frame to couple the respective variously sized canvas frame to the fifth bar 74. In another embodiment, a fourth plate 98 is coupled to the third plate 96 and the fifth bar 74. The fourth plate 98 is perpendicular to the third plate 96 and parallel to the fifth bar 74. The fourth plate 98 is positioned to abut a back side of the respective variously sized canvas frame. In yet another embodiment, each of a pair of slats 100 is coupled to and extends from the fifth bar 74 proximate to a respective opposing terminus 80. Each slat 100 is coupled to the fourth plate 98 proximate to a respective opposing edge 102 of the fourth plate 98 to couple the fourth plate 98 to the fifth bar 74.

In use, the first bar 30 is positioned in the channel 24 and is selectively extendable from the block 18. The first bolt 34 is selectively rotatable relative to the block 18 to selectively couple to the first bar 30. The first bar 30 is selectively fixedly positionable relative to the block 18. The second fastener 58 is positioned to selectively couple to the third bar 52. The third bar 52 is selectively fixedly positionable relative to the tube 48. The slot 54 is positioned to insert the fourth bar 72 to selectively couple a respective holder 68 to the first coupler 46. The respective holder 68 is configured to couple to the canvas.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A canvas holding assembly comprising:
   a base, said base being tripoidal;
   a first plate coupled to and extending from said base such that said first plate is configured to be substantially parallel to a surface upon which said base is positioned and configured for positioning items of a user;
   a first bar selectively extendable from a top of said base;
   a second bar coupled to and extending from said first bar distal from said base;
   a first coupler pivotally coupled to said second bar distal from said first bar, wherein said second bar is positioned on said first bar such that said first coupler is positioned above said first plate, said first coupler including a third bar substantially complementary to a tube such that said third bar is slidably positionable within said tube;
   a plurality of holders, each said holder being configured for coupling to a canvas, each said holder comprising a second coupler, said second coupler being complementary to said first coupler; and
   wherein each said second coupler is positioned on a respective said holder such that said respective said holder is selectively couplable to said second bar and configured for coupling to the canvas, each said second coupler comprising a fourth bar and a fifth bar, said fourth bar being coupled to and extending perpendicularly from said fifth bar, said fourth bar being complementary to a slot, wherein said slot is positioned in said third bar such that said slot is positioned for inserting said fourth bar to couple said holder to said first coupler.

2. The assembly of claim 1, further including said base comprising:
   a pair of first legs coupled to and extending angularly from a lower end of a block;
   a second leg coupled to and extending angularly from a rear of said block such that said second leg and said first legs are trigonally positioned;
   a channel positioned in said block, said channel extending from an upper end toward said lower end of said block, said first bar being complementary to and slidably positionable in said channel, wherein said first bar is positioned in said channel such that said first bar is selectively extendable from said block; and
   a first fastener coupled to said block, said first fastener being configured for selectively coupling to said first bar, wherein said first fastener is positioned on said block such that said first fastener is positioned for selectively coupling to said first bar such that said first bar is selectively fixedly positionable relative to said block.

3. The assembly of claim 1, further including a second plate coupled to said first plate and extending toward said top of said base, wherein said second plate is positioned on said first plate such that said second plate is configured for retaining the items positioned on said first plate.

4. The assembly of claim 3, further including said first plate and said second plate being substantially rectangularly shaped.

5. The assembly of claim 1, further including said plurality of holders comprising a first grasper configured for coupling to a central vertical support of a large canvas frame, wherein said first grasper is selectively positionable on said first coupler such that said first grasper is configured for coupling to the central vertical support positioning the large canvas frame for manipulation by the user.

6. The assembly of claim 5, further including said first grasper comprising a pair of C-clamps coupled and extending perpendicularly from said fifth bar, each said C-clamp being positioned proximate to a respective opposing terminus of said fifth bar, wherein said C-clamps are positioned on said fifth bar such that said C-clamps are configured for coupling to the central vertical support of the large canvas frame to couple the large canvas frame to the fifth bar.

7. The assembly of claim 1, further including said plurality of holders comprising a second grasper configured for coupling to an upper support and a lower support of a small canvas frame, wherein said second grasper is selectively positionable on said first coupler such that said second grasper is configured for coupling to the upper support and the lower support positioning the small canvas frame for manipulation by the user.

8. The assembly of claim 7, further including said second grasper comprising:
   a slit positioned in said fifth bar, said slit extending from proximate to an opposing terminus of said fifth bar;
   a pair of L-brackets, each said L-bracket having a first section slidably positioned in said slit such that said first section extends perpendicularly from said fifth bar, each said L-bracket having a second section coupled to said first section distal from said fifth bar, each of said second sections being parallel to said fifth bar, each of said second sections being opposingly positioned, wherein said L-brackets are slidably positioned in said slit such that said L-brackets are configured for positioning to frictionally couple to the upper support and the lower support of the small canvas frame to couple the small canvas frame to the fifth bar; and
   a pair of connectors, each said connector being coupled to a respective said first section distal from an associated said second section, said connectors being configured for coupling to said fifth bar, wherein said connectors are positioned on each of said first sections such that said connectors are positioned to couple to said fifth bar to fixedly position said L-brackets within said slit.

9. The assembly of claim 1, further including a third grasper configured for coupling to a bottom support of variously sized canvas frames, wherein said third grasper is selectively positionable on said first coupler such that said third grasper is configured for coupling to the bottom support positioning the variously sized canvas frames for manipulation by the user.

10. The assembly of claim 9, further including said third grasper comprising:
    a third plate coupled to and extending perpendicularly from said fifth bar adjacent to a respective said opposing terminus of said fifth bar;
    a fourth plate coupled to said third plate and said fifth bar, said fourth plate being perpendicular to said third plate and parallel to said fifth bar, wherein said third plate is positioned on said fifth bar such that said third plate is configured for coupling to the bottom support of a respective variously sized canvas frame to couple the respective variously sized canvas frame to said fifth bar, wherein said fourth plate is positioned on said third plate and said fifth bar such that said fourth plate is positioned to abut a back side of the respective variously sized canvas frame; and
a pair of slats, said slats being coupled to and extending from said fifth bar proximate to the respective opposing terminus, each said slat being coupled to said fourth plate proximate to a respective opposing edge of said fourth plate such that said fourth plate is coupled to said fifth bar.

11. A canvas holding assembly comprising:
a base, said base being tripoidal, said base comprising:
  a pair of first legs coupled to and extending angularly from a lower end of a block;
  a second leg coupled to and extending angularly from a rear of said block such that said second leg and said first legs are trigonally positioned;
  a channel positioned in said block, said channel extending from an upper end toward said lower end of said block, a first bar being complementary to and slidably positionable in said channel, wherein said first bar is positioned in said channel such that said first bar is selectively extendable from said block; and
  a first fastener coupled to said block, said first fastener being configured for selectively coupling to said first bar, wherein said first fastener is positioned on said block such that said first fastener is positioned for selectively coupling to said first bar such that said first bar is selectively fixedly positionable relative to said block;
a first plate coupled to and extending from said base such that said first plate is configured to be substantially parallel to a surface upon which said base is positioned and configured for positioning items of a user;
a first bar selectively extendable from a top of said base;
a second bar coupled to and extending from said first bar distal from said base;
a first coupler pivotally coupled to said second bar distal from said first bar, wherein said second bar is positioned on said first bar such that said first coupler is positioned above said first plate;
a plurality of holders, each said holder being configured for coupling to a canvas, each said holder comprising a second coupler, said second couplers being complementary to said first coupler;
wherein each said second coupler is positioned on a respective said holder such that said respective said holder is selectively couplable to said second bar and configured for coupling to the canvas; and
said first fastener comprising:
  a first hole positioned in said block, said first hole extending to said channel, said first hole being threaded;
  a first bolt complementary to and positioned in said first hole, wherein said first bolt is positioned in said first hole such that said first bolt is threadedly coupled to said block, such that said first bolt is selectively rotatable relative to said block positioning said first bolt to selectively couple to said first bar, such that said first bar is selectively fixedly positionable relative to said block; and
  a first knob coupled said first bolt distal from said block, wherein said first knob is positioned on said first bolt such that said first knob is configured for grasping in a hand of the user for turning said first bolt within said first hole.

12. A canvas holding assembly comprising:
a base, said base being tripoidal;
a first plate coupled to and extending from said base such that said first plate is configured to be substantially parallel to a surface upon which said base is positioned and configured for positioning items of a user;
a first bar selectively extendable from a top of said base;
a second bar coupled to and extending from said first bar distal from said base;
a first coupler pivotally coupled to said second bar distal from said first bar, wherein said second bar is positioned on said first bar such that said first coupler is positioned above said first plate;
a plurality of holders, each said holder being configured for coupling to a canvas, each said holder comprising a second coupler, said second coupler being complementary to said first coupler;
wherein each said second coupler is positioned on a respective said holder such that said respective said holder is selectively couplable to said second bar and configured for coupling to the canvas; and
said first coupler comprising:
  a tube pivotally coupled to said second bar distal from said first bar, said second bar being positioned substantially equally distant from opposing ends of said tube, said tube being hollow, said tube being substantially rectangularly shaped when viewed longitudinally;
  a third bar substantially complementary to said tube such that said third bar is slidably positionable within said tube;
  a slot positioned through said third bar proximate to a respective opposing endpoint of said third bar;
  a second fastener coupled to said tube, said second fastener being configured for selectively coupling to said third bar; and
  wherein said second fastener is positioned on said tube such that said second fastener is positioned for selectively coupling to said third bar such that said third bar is selectively fixedly positionable relative to said tube.

13. The assembly of claim 12, further including said second fastener comprising:
  a second hole positioned through a side of said tube, said second hole being threaded;
  a second bolt complementary to and positioned in said second hole, wherein said second bolt is positioned in said second hole such that said second bolt is threadedly coupled to said tube, such that said second bolt is selectively rotatable relative to said tube positioning said second bolt to selectively couple to said third bar, such that said third bar is selectively fixedly positionable relative to said tube; and
  a second knob coupled said second bolt distal from said tube, wherein said second knob is positioned on said second bolt such that said second knob is configured for grasping in a hand of the user for turning said second bolt within said second hole.

14. The assembly of claim 1, further comprising:
said base comprising:
  a pair of first legs coupled to and extending angularly from a lower end of a block,
  a second leg coupled to and extending angularly from a rear of said block such that said second leg and said first legs are trigonally positioned,
  a channel positioned in said block, said channel extending from an upper end toward said lower end of said block, and a first fastener coupled to said block, said first fastener being configured for selectively coupling to said first bar, wherein said first fastener is positioned on said block such that said first fastener is positioned for selectively coupling to said first bar such that said first bar is selectively fixedly positionable relative to said block, said first fastener comprising:
  a first hole positioned in said block, said first hole extending to said channel, said first hole being threaded,
  a first bolt complementary to and positioned in said first hole, wherein said first bolt is positioned in said first hole such that said first bolt is threadedly coupled to said block, and
  a first knob coupled said first bolt distal from said block, wherein said first knob is positioned on said first bolt such that said first knob is configured for grasping in a hand of the user for turning said first bolt within said first hole;
said first plate being substantially rectangularly shaped;
a second plate coupled to said first plate and extending toward the top of said base, wherein said second plate is positioned on said first plate such that said second plate is configured for retaining the items positioned on said first plate, said second plate being substantially rectangularly shaped;
said first bar being complementary to and slidably positionable in said channel, wherein said first bar is positioned in said channel such that said first bar is selectively extendable from said block, such that said first bolt is selectively rotatable relative to said block positioning said first bolt to selectively couple to said first bar, such that said first bar is selectively fixedly positionable relative to said block;
said first coupler comprising:
  said tube being pivotally coupled to said second bar distal from said first bar, said second bar being positioned substantially equally distant from opposing ends of said tube, said tube being hollow, said tube being substantially rectangularly shaped when viewed longitudinally,
  the slot positioned through said third bar proximate to a respective opposing endpoint of said third bar, and
  a second fastener coupled to said tube, said second fastener being configured for selectively coupling to said third bar, wherein said second fastener is positioned on said tube such that said second fastener is positioned for selectively coupling to said third bar such that said third bar is selectively fixedly positionable relative to said tube, said second fastener comprising:
    a second hole positioned through a side of said tube, said second hole being threaded,
    a second bolt complementary to and positioned in said second hole, wherein said second bolt is positioned in said second hole such that said second bolt is threadedly coupled to said tube, such that said second bolt is selectively rotatable relative to said tube positioning said second bolt to selectively couple to said third bar, such that said third bar is selectively fixedly positionable relative to said tube, and
    a second knob coupled said second bolt distal from said tube, wherein said second knob is positioned on said second bolt such that said second knob is configured for grasping in a hand of the user for turning said second bolt within said second hole;

said plurality of holders comprising:
  a first grasper configured for coupling to a central vertical support of a large canvas frame, wherein said first grasper is selectively positionable on said first coupler such that said first grasper is configured for coupling to the central vertical support positioning the large canvas frame for manipulation by the user, said first grasper comprising a pair of C-clamps coupled and extending perpendicularly from said fifth bar, each said C-clamp being positioned proximate to a respective opposing terminus of said fifth bar, wherein said C-clamps are positioned on said fifth bar such that said C-clamps are configured for coupling to the central vertical support of the large canvas frame to couple the large canvas frame to the fifth bar,
  a second grasper configured for coupling to an upper support and a lower support of a small canvas frame, wherein said second grasper is selectively positionable on said first coupler such that said second grasper is configured for coupling to the upper support and the lower support positioning the small canvas frame for manipulation by the user, said second grasper comprising:
    a slit positioned in said fifth bar, said slit extending from proximate to said opposing termini of said fifth bar,
    a pair of L-brackets, each said L-bracket having a first section slidably positioned in said slit such that said first section extends perpendicularly from said fifth bar, each said L-bracket having a second section coupled to said first section distal from said fifth bar, said second sections being parallel to said fifth bar, said second sections being opposingly positioned, wherein said L-brackets are slidably positioned in said slit such that said L-brackets are configured for positioning to frictionally couple to the upper support and the lower support of the small canvas frame to couple the small canvas frame to the fifth bar, and
    a pair of connectors, each said connector being coupled to a respective said first section distal from an associated said second section, said connectors being configured for coupling to said fifth bar, wherein said connectors are positioned on said first sections such that said connectors are positioned to couple to said fifth bar to fixedly position said L-brackets within said slit, and
  a third grasper configured for coupling to a bottom support of variously sized canvas frames, wherein said third grasper is selectively positionable on said first coupler such that said third grasper is configured for coupling to the bottom support positioning the variously sized canvas frames for manipulation by the user, said third grasper comprising:
    a third plate coupled to and extending perpendicularly from said fifth bar adjacent to a respective said opposing terminus of said fifth bar,
    a fourth plate coupled to said third plate and said fifth bar, said fourth plate being perpendicular to said third plate and parallel to said fifth bar, wherein said third plate is positioned on said fifth bar such that said third plate is configured for coupling to the bottom support of a respective variously sized canvas frame to couple the respective variously sized canvas frame to said fifth bar, wherein said fourth plate is positioned on said third plate and said fifth bar such that said fourth plate is positioned to abut a back side of the respective variously sized canvas frame, and a pair of slats, said slats being coupled to and extending from said fifth bar proximate to the respective opposing terminus, each said slat being coupled to said fourth plate proximate to a respective opposing edge of said fourth plate such that said fourth plate is coupled to said fifth bar; and wherein said first bar is positioned in said channel such that said first bar is selectively extendable from said block, such that said first bolt is selectively rotatable relative to said block positioning said first bolt to selectively couple to said first bar, such that said first bar is selectively fixedly positionable relative to said block, wherein said second fastener is positioned on said tube such that said second fastener is positioned for selectively coupling to said third bar such that said third bar is selectively fixedly positionable relative to said tube, wherein said slot is positioned in said third bar such that said slot is positioned for inserting said fourth bar to selectively couple a respective said holder to said first coupler, wherein said respective said holder is configured for coupling to the canvas.

* * * * *